(12) United States Patent
Wang et al.

(10) Patent No.: US 9,955,168 B2
(45) Date of Patent: Apr. 24, 2018

(54) CONSTRAINING NUMBER OF BITS GENERATED RELATIVE TO VBV BUFFER

(71) Applicant: ARRIS Enterprises, Inc., Suwanee, GA (US)

(72) Inventors: Limin Wang, San Diego, CA (US); Seungwook Hong, San Diego, CA (US)

(73) Assignee: ARRIS Enterprises LLC, Suwanee, GA (US)

(*) Notice: Subject to any disclaimer, the term of this patent is extended or adjusted under 35 U.S.C. 154(b) by 248 days.

(21) Appl. No.: 15/041,106

(22) Filed: Feb. 11, 2016

(65) Prior Publication Data

US 2016/0234506 A1 Aug. 11, 2016

Related U.S. Application Data

(60) Provisional application No. 62/114,841, filed on Feb. 11, 2015.

(51) Int. Cl.
| | |
|---|---|
| *H04N 7/12* | (2006.01) |
| *H04N 19/152* | (2014.01) |
| *H04N 19/423* | (2014.01) |
| *H04N 19/436* | (2014.01) |
| *H04N 19/132* | (2014.01) |
| *H04N 19/176* | (2014.01) |
| *H04N 19/15* | (2014.01) |

(52) U.S. Cl.
CPC ......... *H04N 19/152* (2014.11); *H04N 19/132* (2014.11); *H04N 19/15* (2014.11); *H04N 19/176* (2014.11); *H04N 19/423* (2014.11); *H04N 19/436* (2014.11)

(58) Field of Classification Search
None
See application file for complete search history.

(56) References Cited

U.S. PATENT DOCUMENTS

| | | | | |
|---|---|---|---|---|
| 5,949,490 | A * | 9/1999 | Borgwardt | H04N 19/159 375/240.05 |
| 5,986,712 | A * | 11/1999 | Peterson | H04N 19/159 375/240.14 |
| 7,072,393 | B2 * | 7/2006 | Boice | H04N 5/145 348/E5.066 |
| 7,085,322 | B2 * | 8/2006 | Ngai | H04N 21/23655 375/240.25 |
| 8,054,880 | B2 * | 11/2011 | Yu | H04N 21/23406 375/240.03 |

(Continued)

*Primary Examiner* — Nhon Diep
(74) *Attorney, Agent, or Firm* — Thomas A. Ward

(57) ABSTRACT

A method is provided for encoding multiple video frames in parallel. The method includes the steps of generating an estimated starting fullness level of a VBV buffer before encoding begins, beginning parallel frame encoding, monitoring the number of bits produced for each parallel frame during encoding, tracking the number of unencoded CTUs within each parallel frame during encoding, continuously updating an actual fullness level of the VBV buffer relative to each parallel frame during encoding, and encoding in skip mode any remaining unencoded CTUs in a particular frame and any preceding frames when the difference between the actual fullness level for a frame and a minimum fullness level for the VBV Buffer equals the number of remaining unencoded CTUs in that particular frame.

15 Claims, 8 Drawing Sheets

(56) References Cited

U.S. PATENT DOCUMENTS

| | | | |
|---|---|---|---|
| 9,445,110 B2* | 9/2016 | Leontaris | H04N 19/80 |
| 2015/0103921 A1* | 4/2015 | Hannuksela | H04N 19/152 |
| | | | 375/240.26 |
| 2015/0358645 A1* | 12/2015 | Thirumalai | H04N 19/119 |
| | | | 375/240.02 |

* cited by examiner

| Estimated Fullness Level 608 Prior to Encoding Frame i ($B_{i\text{-}}$) | $B_{i\text{-}}$ |
|---|---|
| Estimated Fullness Level 608 Prior to Encoding Frame i+1 ($B_{i+1\text{-}}$) | $B_{i\text{-}} - (R_{i\_estimate} - R_{avg})$ |
| Estimated Fullness Level 608 Prior to Encoding Frame i+2 ($B_{i+2\text{-}}$) | $B_{i\text{-}} - (R_{i\_estimate} - R_{avg}) - (R_{i+1\_estimate} - R_{avg})$ |
| Estimated Fullness Level 608 Prior to Encoding Frame i+3 ($B_{i+3\text{-}}$) | $B_{i\text{-}} - (R_{i\_estimate} - R_{avg}) - (R_{i+1\_estimate} - R_{avg}) - (R_{i+2\_estimate} - R_{avg})$ |

FIG. 8

| Estimated Fullness Level 608 During Encoding of Frame i | $B_{i\text{-}} - R_i$ |
|---|---|
| Estimated Fullness Level 608 Duing Encoding of Frame i+1 | $B_{i\text{-}} + R_{avg} - (R_i + R_{i+1})$ |
| Estimated Fullness Level 608 During Encoding of Frame i+2 | $B_{i\text{-}} + 2R_{pvg} - (R_i + R_{i+1} + R_{i+2})$ |
| Estimated Fullness Level 608 During Encoding of Frame i+3 | $B_{i\text{-}} + 3R_{avg} - (R_i + R_{i+1} + R_{i+2} + R_{i+3})$ |

FIG. 9

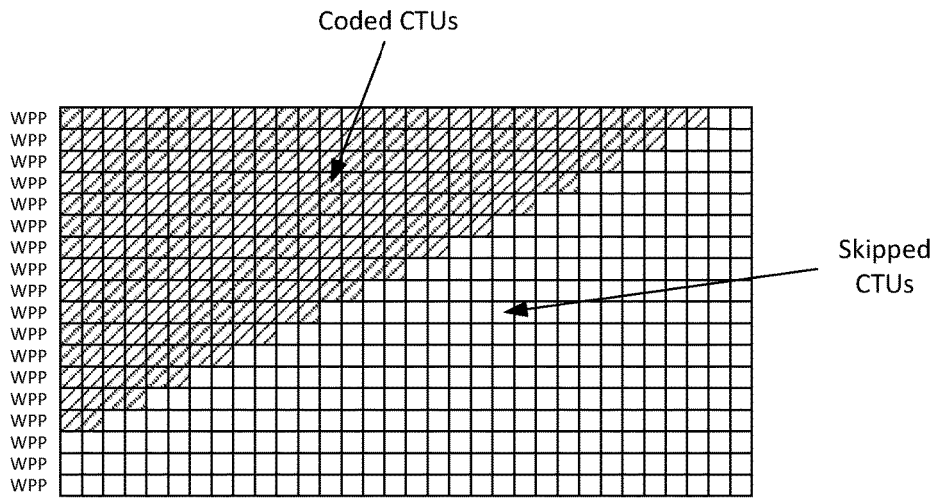

FIG. 10

Constraint Conditions

| | |
|---|---|
| Skip Remaining CTUs 302 of Frame i if: | $B_{i-} - R_i - B_{low} = 1 \times N_{remainingCTU}$ bits |
| Skip Remaining CTUs 302 of Frames i and i+1 if: | $B_{i-} + R_{avg} - (R_i + R_{i+1}) - B_{low} = 1 \times N_{remainingCTU}$ bits |
| Skip Remaining CTUs 302 of Frames i, i+1, and i+2 if: | $B_{i-} + 2R_{avg} - (R_i + R_{i+1} + R_{i+2}) - B_{low} = 1 \times N_{remainingCTU}$ bits |
| Skip Remaining CTUs 302 of Frames i, i+1, i+2, and i+3 if: | $B_{i-} + 3R_{avg} - (R_i + R_{i+1} + R_{i+2} + R_{i+3}) - B_{low} = 1 \times N_{remainingCTU}$ bits |

CONSTRAINING NUMBER OF BITS GENERATED RELATIVE TO VBV BUFFER

CLAIM OF PRIORITY

This Application claims priority under 35 U.S.C. § 119(e) from earlier filed U.S. Provisional Application Ser. No. 62/114,841, filed Feb. 11, 2015, which is hereby incorporated by reference.

TECHNICAL FIELD

The present disclosure relates to the field of video compression, particularly video compression using a VBV Buffer (Video Buffering Verifier Buffer) to adjust the bitrate of a generated bitstream.

BACKGROUND

A video encoder can maintain a VBV Buffer (Video Buffering Verifier Buffer) that emulates a decoding device's input buffer. The video encoder can generate a bitstream, and use the model of the VBV Buffer to adjust the bitrate of the bitstream such that it avoids overflow and/or underflow of the VBV Buffer.

The fullness level of the VBV Buffer can be modeled over time by comparing a constant input rate tied to an average number of bits per frame with a variable output rate tied to the actual bitrate of the generated bitstream. When the modeled fullness level nears a maximum threshold, the encoder can decrease values of a quantization parameter to increase the bitstream's bitrate. Such an increase in the bitstream's bitrate can raise the output rate closer to the constant input rate, and thereby decrease the modeled fullness level. Similarly, when the modeled fullness level nears a minimum threshold, the encoder can increase values of the quantization parameter to decrease the bitstream's bitrate. Such a decrease in the bitstream's bitrate can lower the output rate closer to the constant input rate, and thereby increase the modeled fullness level.

When an encoder is encoding multiple frames in parallel with one another, the actual fullness level of the VBV may not be available, as frames earlier in the coding order might not yet be finished encoding. As such, the encoder can estimate what the fullness level would be immediately prior to each parallel frame. This can allow the encoder to find a value for the quantization parameter to use when beginning encoding of each parallel frame.

However, estimations of the fullness level just prior to each parallel frame can be inaccurate, as they can rely on an estimate of how many bits will be generated per frame. If the actual number of bits differs from the estimates, the selected value of the quantization parameter can be too low, resulting in too many bits being generated for the bitstream. A bitstream with too many bits runs the risk of underflowing the VBV Buffer.

SUMMARY

What is needed is a method of constraining the number of bits that are actually being generated while encoding frames in parallel, such that the number of bits being produced for the bitstream on a per frame basis is less likely to underflow the VBV Buffer.

In one embodiment, the present disclosure provides for a method of encoding multiple frames of a video in parallel, the method comprising receiving a plurality of frames to encode in parallel at an encoder, the plurality of frames being ordered in a coding order, generating an estimated starting fullness level of a video buffering verifier buffer prior to beginning encoding the plurality of frames, beginning parallel encoding of the plurality of frames with the encoder, by encoding coding tree units within each of the plurality of frames, monitoring the number of bits produced for each of the plurality of frames during parallel encoding of the plurality of frames, tracking the number of unencoded coding tree units within each of the plurality of frames during parallel encoding of the plurality of frames, continuously updating an actual fullness level of the video buffering verifier buffer relative to each frame during parallel encoding of the plurality of frames, by adding an average number of bits produced per frame for each preceding frame in the coding order to the estimated starting fullness level, and subtracting the number of bits produced for each coding tree unit that has been encoded so far in the frame and each preceding frame in the coding order, and encoding in skip mode any remaining unencoded coding tree units in a particular frame and any preceding frames in the coding order when the difference between the particular frame's actual fullness level and a minimum fullness threshold for the video buffering verifier buffer equals the number of remaining unencoded coding tree units in that particular frame.

In another embodiment, the present disclosure provides for a method of encoding multiple frames of a video in parallel, the method comprising receiving a plurality of frames to encode in parallel at an encoder, modeling the fullness level of a video buffering verifier buffer over time, relative to a constant input rate and a variable output rate, generating an estimated fullness level for each of the plurality of frames, based on what the fullness level would be immediately prior to encoding of each of the plurality of frames, wherein the estimated fullness level is estimated at least in part based on an estimate of the number of bits that will be used to encode each of the plurality of frames, selecting a value for a quantization parameter for each of the plurality of frames, based on the estimated fullness level for each of the plurality of frames, beginning encoding of a plurality of coding tree units within each of the plurality of frames using the selected values of the quantization parameters, generating an estimated actual fullness level for each of the plurality of frames, based on the number of bits actually generated during encoding of the plurality of coding tree units, determining whether any of a plurality of constraint conditions applies, and encoding in skip mode any of the plurality of coding tree units that have not yet been encoded upon a determination that one of the plurality of constraint conditions applies.

BRIEF DESCRIPTION OF THE DRAWINGS

Further details of the present invention are explained with the help of the attached drawings in which:

FIG. 8 depicts formulas for estimating the VBV Buffer's fullness level immediately before each frame being encoded in parallel.

FIG. 9 depicts formulas for estimating the fullness levels for each parallel frame once encoding has begun.

FIG. 10 depicts an example of encoding remaining unencoded CTUs in skip mode after some CTUs have already been encoded.

FIG. 11 depicts exemplary constraint conditions, that if triggered, can lead an encoder to enter skip mode for remaining CTUs.

DETAILED DESCRIPTION

Figure 1:
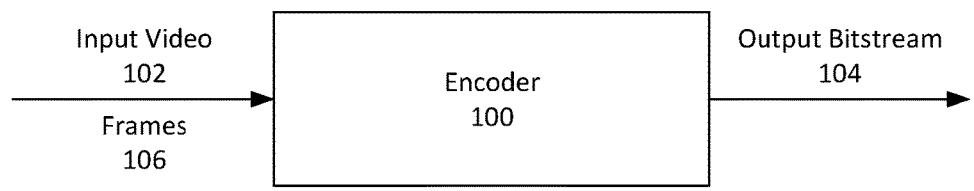
FIG. 1 depicts an embodiment of an encoder.

FIG. 1 depicts an embodiment of an encoder 100. An encoder 100 can comprise processors, memory, circuits, and/or other hardware and software elements configured to encode, transcode, and/or compress input video 102 into an output bitstream 104. In some embodiments, an encoder 100 can be a dedicated hardware device. In other embodiments an encoders 100 can be, or use, software programs running on other hardware such as servers, computers, or video processing devices.

An input video 102 can comprise a series of frames 106. In some embodiments or situations the input video 102 can be raw and/or uncompressed video, while in other embodiments or situations the input video 102 can have been partially pre-processed or compressed by other equipment. The encoder 100 can receive input video 102 from a source. By way of a non-limiting example, the input video 102 can be received by the encoder 100 over a network or other data connection from a broadcaster, content provider, or any other source. By way of another non-limiting example, the input video 102 can be a file loaded to the encoder 100 from a hard disk or other memory storage device connected to the encoder 100.

The encoder 100 can be configured to process the frames 106 of the input video 102 to generate an output bitstream 104, such as encoding the input video 102 into a different format and/or compressing the input video 102 into a smaller size so that it can be more efficiently stored or transmitted. By way of a non-limiting example, the output bitstream 104 produced by the encoder 100 can be configured to be decoded and/or decompressed by other devices for playback.

Figure 2:
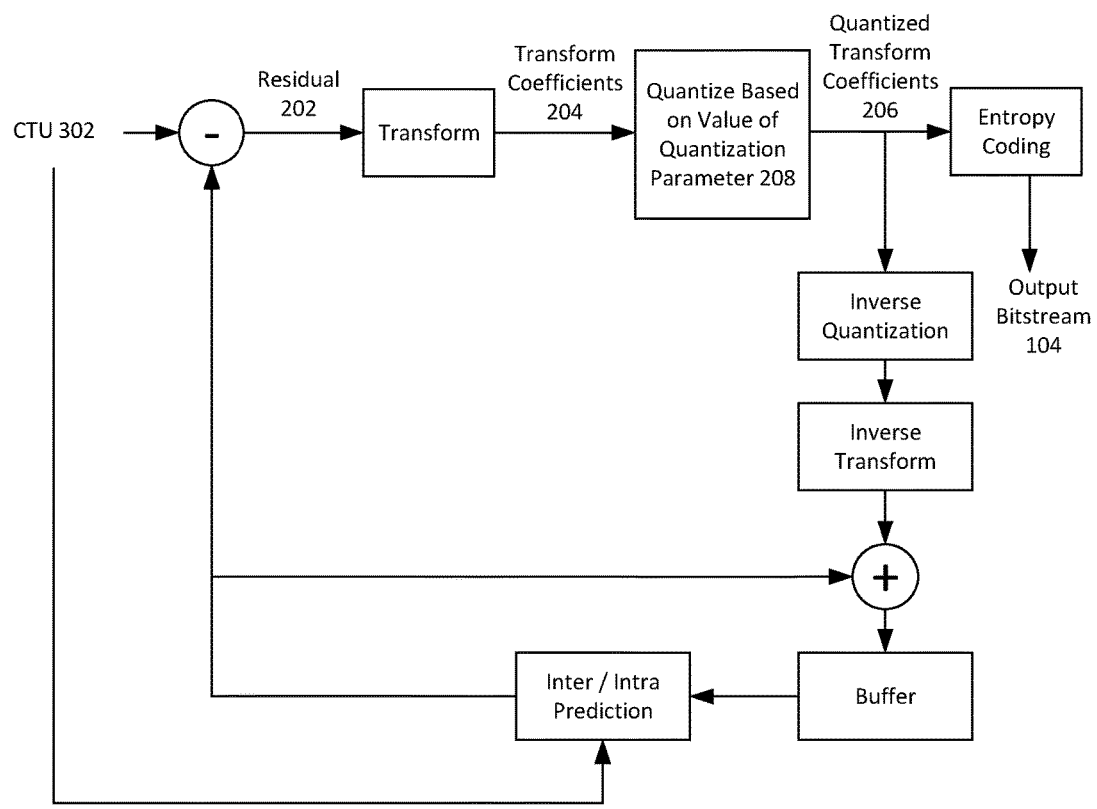
FIG. 2 depicts a flow chart for a method of generating an output bitstream from an input video with an encoder.

FIG. 2 depicts a flow chart for a method of generating an output bitstream 104 from an input video 102 with an encoder 100. In some embodiments the encoder 100 can be configured to generate the output bitstream 104 according to the HEVC (High Efficiency Video Coding) format. In other embodiments, the encoder 100 can be configured to generate the output bitstream 104 according any other video coding format and/or compression standard, such as MPEG-2 or H.264/MPEG-4 AVC (Advanced Video Coding).

Figure 3:
FIG. 3 depicts an input frame broken into a plurality of coding tree units (CTUs).

In HEVC, the pixels of an input frame 106 can be broken into coding tree units (CTUs) 302, as shown in FIG. 3. The encoder 100 can encode each individual CTU 302, or coding units (CUs) or prediction units (PUs) within each CTU 302, using intra-prediction or inter-prediction. Coding a CTU 302 with intra-prediction uses spatial prediction based on other similar sections of the same frame 106, or the same slice of CTUs 302 in the same frame 106. Coding a CTU 302 with inter-prediction uses temporal prediction to encode motion vectors that point to similar sections of the same frame 106 or slice, or a different frame 106 or slice, such as a preceding or subsequent frame 106 in the input video 102. In other video coding formats or compression standards, other types of frame segments, such as macroblocks, can be encoded similarly to how CTUs 302 are encoded in HEVC.

A frame 106 with CTUs 302 encoded entirely with intra-prediction can be referred to as an "I-frame." I-frames can be encoded or decoded independently from other frames 106, as each of its CTUs 302 can be coded with reference to other sections of the same frame 106. Frames 106 with at least some CTUs 302 encoded with inter-prediction can be referred to as "P-frames" when the inter-predicted CTUs 302 refer back to earlier CTUs 302, or as "B-frames" when the inter-predicted CTUs 302 refer to both earlier and subsequent CTUs 302.

Returning to FIG. 2, in some situations differences between a frame's CTUs 302 and other sections they reference in the same or other frames 106 through inter-prediction or intra-prediction can be encoded to save space and bandwidth, rather than encoding the entire frame 106. These differences, which can be referred to as the residual 202 of a CTU 302, can be encoded by performing a spatial transform on the residual 202 to produce transform coefficients 204. By way of a non-limiting example, a frame's residual 202 can be transformed with a Discrete Cosine Transform (DCT) to produce DC and AC transform coefficients 204. Each resulting transform coefficient 204 can then be quantized into one of a finite number of possible values to create a quantized transform coefficient 206.

The finite number of possible values for the quantized transform coefficients 206 can be dependent on the value of a quantization parameter 208. The value of the quantization parameter 208 can indicate the step size between each possible value for the quantized transform coefficients 206. Decreasing the value of the quantization parameter 208 can increase the number of possible quantized values for the quantized transform coefficients 206, such that finer details of the residual 202 can be encoded with different quantized values. As such, decreasing the quantization parameter 208 can often lead to more bits in the output bitstream 104 and thereby improve visual quality. In contrast, increasing the value of the quantization parameter 208 can decrease the number of possible quantized values for the quantized transform coefficients 206, such that some details of the residual 202 can be lost when they are quantized into the same value. As such, increasing the quantization parameter 208 can often lead to fewer bits in the output bitstream 104 and thereby decrease visual quality.

An encoder 100 can use a rate control scheme while processing input video 102 to control the allocation of bits in the output bitstream 104 it produces. One such rate control scheme can be to dynamically adjust the value of the quantization parameter 208 to adjust the bitrate and picture quality of the output bitstream 104, as lowering the quantization parameter 208 can result in a higher bitrate, while increasing the quantization parameter 208 can result in a lower bitrate. As such, an encoder 100 can use a rate control scheme to vary the quantization parameter 208 in an attempt to achieve a desired target bitrate in the output bitstream 104.

After transform coefficients 204 have been quantized into quantized transform coefficients 206 based on the value of the quantization parameter 208, the quantized transform coefficients 206 can be encoded as part of an output bitstream 104. In some embodiments, the quantized transform coefficients 206 can be entropy encoded. By way of a non-limiting example, in HEVC quantized transform coefficients 206 can be entropy encoded using CABAC (context-adaptive binary arithmetic coding).

As shown in FIG. 2, quantized transform coefficients 206 can also be inverse quantized and inverse transformed, and the result can then combined with the residual 202 to recreate frames 106 and/or CTUs 302 that can be held in a buffer within the encoder 100 to assist with inter prediction and/or intra prediction of subsequent CTUs 302. By way of a non-limiting example, an encoder can encode a CTU 302 in a P-frame with reference to another frame 106 or CTU 302 that has already been encoded, and the encoder 100 can access and/or reference that preceding frame 106 or CTU 302 in the buffer when coding the new CTU 302.

While FIG. 2 depicts standard encoding of CTUs 302, in other situations the encoder 100 can encode a unit, such as a CTU 302 or individual CUs or PUs within a CTU 302, in skip mode. In skip mode, a unit can be encoded with inter prediction, and a motion vector pointing from the unit to a predicted unit in a reference frame 106 can be coded directly in the output bitstream 104 without coding the residual 202 indicating the differences between the unit and the predicted unit. As such, in some embodiments there are no transform coefficients 204 to be quantized and entropy coded when encoding in skip mode. In other embodiments, the transform coefficients 204 and/or quantized transform coefficients 206 can be set to zero when encoding in skip mode. By encoding a unit with a motion vector referring to a different predicted unit and skipping coding the residual 202 differences between them, the bitrate of the output bitstream 104 can be decreased, although details of the unit can be lost if they are not present in the predicted unit.

Figure 4:
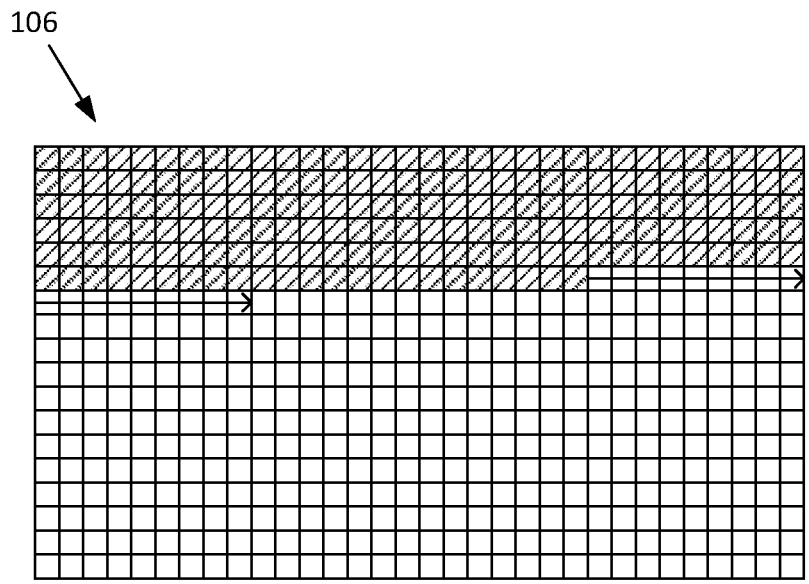
FIG. 4 depicts CTUs being encoded in raster order.
Figure 5:
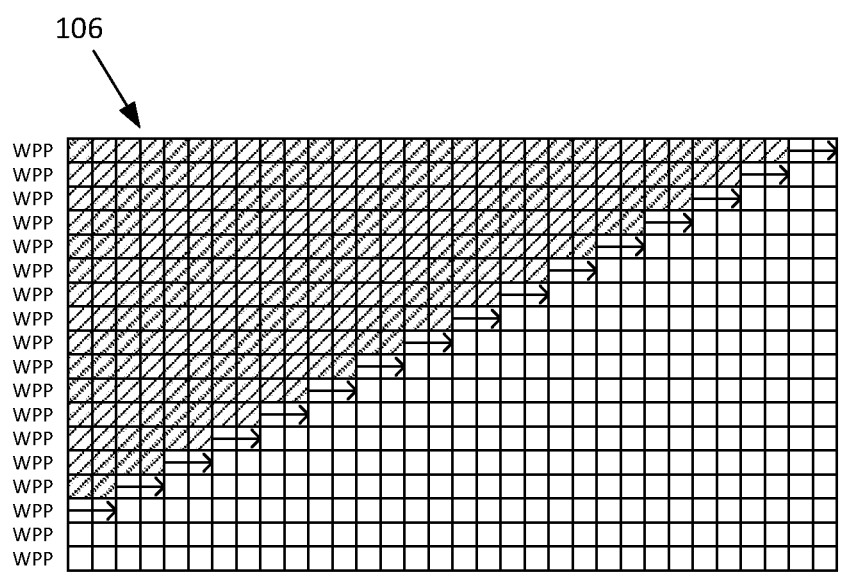
FIG. 5 depicts lines of CTUs being encoded in parallel, using wavefront parallel processing.

In some embodiments the encoder 100 can encode the CTUs 302 of a frame 106 sequentially in raster scanning order, either across the entire frame 106 or across smaller slices of CTUs 302 that are processed sequentially, as shown in FIG. 4. In other embodiments the encoder 100 can encode multiple lines or slices of CTUs from a single frame 106 at least partially in parallel. By way of a non-limiting example, in some embodiments an encoder 100 can use wavefront parallel processing (WPP) to encode CTUs from multiple lines of CTUs, with encoding of each subsequent line beginning on a delayed basis relative to when encoding began on the preceding line but before encoding of the preceding line is complete, as shown in FIG. 5.

Figure 6:
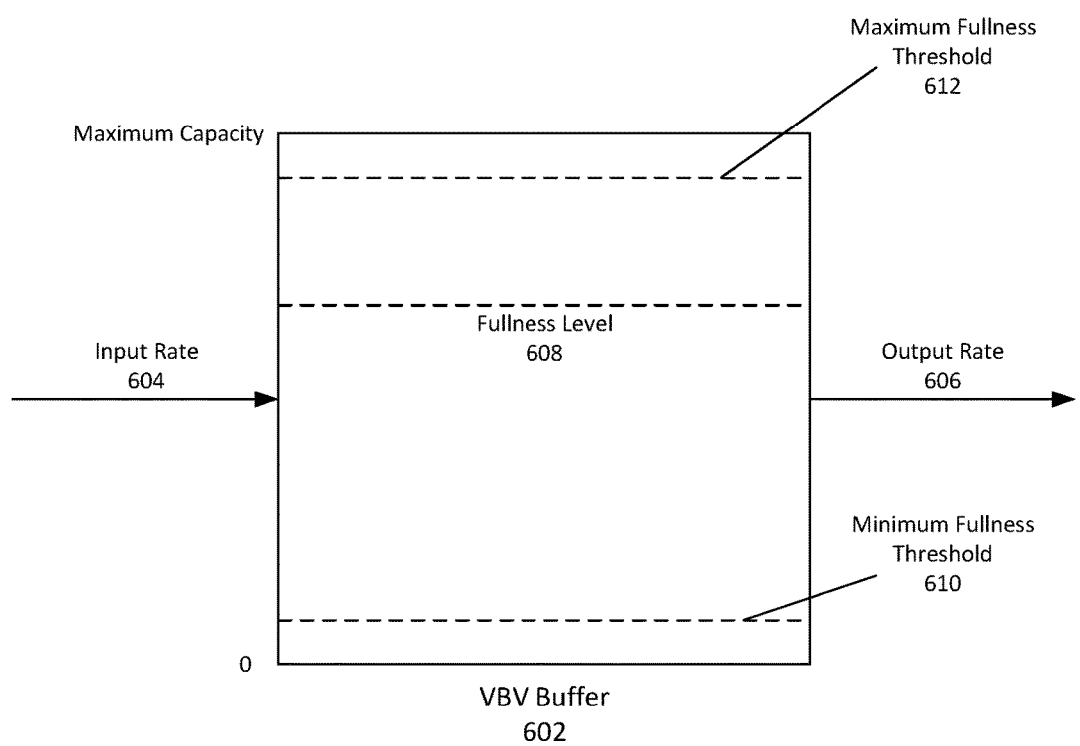
FIG. 6 depicts an embodiment of a VBV Buffer (Video Buffering Verifier Buffer).

FIG. 6 depicts an embodiment of a VBV Buffer (Video Buffering Verifier Buffer) 602. A VBV Buffer 602 can be a virtual representation of a conceptual model of a decoding device's input buffer that is maintained in memory at the encoder 100. The encoder 100 can use the VBV Buffer 602 to simulate and/or estimate how full the decoder's input buffer would be at different points in time based on the bitrate of the encoder's output bitstream 104.

The encoder 100 can use a rate control scheme, such as increasing or decreasing the value of the quantization parameter 208, to adjust the bitrate of its output bitstream 104 to avoid overflow and/or underflow of the VBV Buffer 602. By adjusting the bitrate of the output bitstream 104 to avoid overflow and/or underflow of the conceptual VBV Buffer 602, the bitrate of the output bitstream 104 can be less likely to cause overflow and/or underflow of the decoding device's input buffer and thus be more likely to be decoded properly.

The encoder 100 can model the VBV Buffer 602 over time using an input rate 604, an output rate 606, and a fullness level 608. The fullness level 608 can change over time as the output rate 606 changes relative to the input rate 604. The encoder 100 can consider the VBV Buffer 602 to have a minimum fullness threshold 610 set at a level of 0 or above, and a maximum fullness threshold 612 set at or below the VBV Buffer's total capacity. The VBV Buffer 602 can risk underflow when the fullness level 608 is at or below the minimum fullness threshold 610. The VBV Buffer 602 can risk overflow when the fullness level 608 is at or above the maximum fullness threshold 612.

The encoder 100 can set the input rate 604 to be a constant rate at which data is considered to enter the VBV Buffer 602. The input rate 604 can be set at a constant rate, such as an average number of bits per frame 106.

The output rate 606 can be a variable rate at which data is considered to leave the VBV Buffer 602. The output rate 606 can vary over time on a per-frame basis, depending on the number of bits encoded for each frame 106. As such, the output rate 606 can reflect the actual bitrate of the output bitstream 104. Individual frames 106 can be encoded with different numbers of bits depending on their details and the type of frame 106. By way of a non-limiting example, I-frames are generally encoded with a relatively large amount of bits, while P-frames and B-frames are generally encoded with fewer bits. The output rate 606 can thus reflect the amount of data that a decoder would need to remove from its input buffer to decode each individual frame 106. In some embodiments, the output rate 606 can change at each DTS (Decoding Time Stamp) when a decoding device would remove bits for the next frame 106 from its input buffer to be decoded.

In some situations, the output bitstream's actual bitrate can be above the VBV Buffer's constant input rate 604. By way of a non-limiting example, when the input rate 604 is a constant rate set at the average number of bits per second, the output bitstream's actual bitrate can be higher than the input rate 604 when the output bitstream 104 is encoded with more bits than average. When the output bitstream's actual bitrate is above the input rate 604, bits can be considered to enter the VBV Buffer 602 at the lower constant input rate 604, but exit the VBV Buffer 602 at a higher output rate 606 equal to the actual bitrate of the output bitstream 104. As such, the modeled fullness level 608 can decrease. Over time, decreases in the fullness level 608 can risk underflow of the VBV Buffer 602 when the fullness level 608 nears the minimum fullness threshold 610. The encoder 100 can take corrective steps to avoid underflow of the VBV Buffer 602, such as by increasing values of the quantization parameter 208 to lower the output bitstream's bitrate, and thus moving the output bitstream's bitrate closer to, or below, the VBV Buffer's constant input rate 604.

In other situations, the output bitstream's actual bitrate can be below the VBV Buffer's constant input rate 604. By way of a non-limiting example, when the input rate 604 is a constant rate set at the average number of bits per second, the output bitstream's actual bitrate can be lower than the input rate 604 when the output bitstream 104 is encoded with fewer bits than average. When the output bitstream's actual bitrate is below the input rate 604, bits can still be considered to enter the VBV Buffer 602 at the higher constant input rate 604, but exit the VBV Buffer 602 at a lower output rate 606 equal to the actual bitrate of the output bitstream 104. As such, the modeled fullness level 608 can increase. Over time, increase in the fullness level 608 can risk overflow of the VBV Buffer 602 when the fullness level 608 nears the maximum fullness threshold 612. The encoder 100 can take corrective steps to avoid overflow of the VBV Buffer 602, such as by decreasing values of the quantization parameter 208 to increase the output bitstream's bitrate, and thus moving the output bitstream's bitrate closer to, or above, the VBV Buffer's constant input rate 604.

The encoder 100 can continuously track the variation of the VBV Buffer's fullness level 608 over a window of the most recently encoded frames 106. By way of a non-limiting example, the encoder 100 can track the variation of the fullness level 608 over the last four frames 106, or a window of any other number of frames 106. The variation of the fullness level 608 over a recent window of frames 106 can indicate whether the fullness level 608 has been recently decreasing and underflow of the VBV Buffer 602 is a risk, or whether the fullness level 608 has been recently increasing and overflow of the VBV Buffer 602 is a risk.

As part of a rate control scheme, the encoder 100 can take the variation of the VBV Buffer's fullness level 608 over a recent window of frames 106 into account when selecting a value for the quantization parameter 208 when encoding a new frame 106, if the frame 106 is not being encoded in skip mode. As described above, in some embodiments a lower quantization parameter 208 can be selected if the VBV Buffer 602 is nearing overflow, while a higher quantization parameter 208 can be selected if the VBV Buffer 602 is nearing underflow.

In some embodiments, the fullness level 608 of the VBV Buffer 602 immediately before each new frame 106 is encoded can be weighted most heavily when considering the variation of the VBV Buffer's fullness level 608 over a recent window of frames 106. As such, the fullness level 608 of the VBV Buffer 602 immediately before each new frame 106 can impact selection of the value for its quantization parameter 208.

The encoder 100 can be configured to encode multiple frames 106 at the same time in parallel with one another. By way of a non-limiting example, an encoder 100 can be encoding four different frames 106 using the process of FIG. 2 at the same time. In some embodiments or situations, the frames 106 being encoded in parallel can be encoded in a different order than they will be displayed, while in other embodiments or situations the frames 106 being encoded in parallel can be encoded in the same order as their display order.

Figure 7:
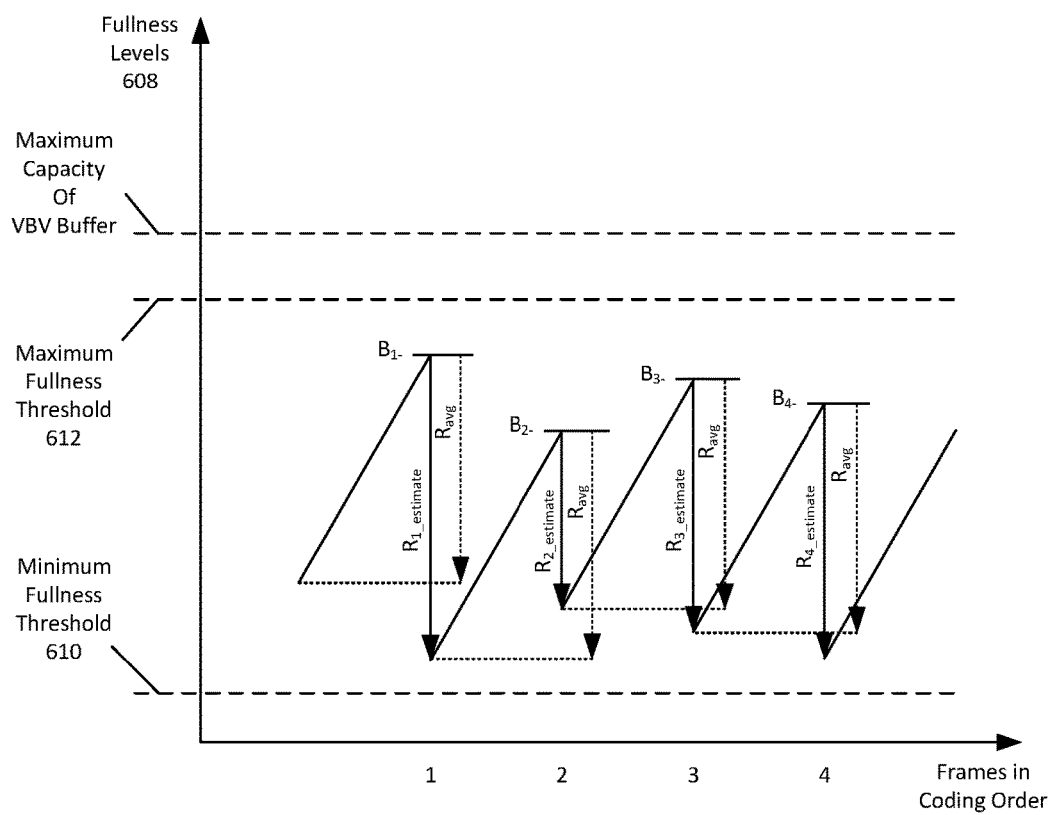
FIG. 7 depicts an example of fullness levels of the VBV Buffer being estimated immediately prior to each frame being encoded in parallel.

When the encoder 100 is encoding multiple frames 106 in parallel, encoding of preceding frames 106 in the coding order may not yet be complete when the encoder 100 begins to encode a subsequent frame 106 in the coding order. As such, the encoder 100 can estimate what the fullness level 608 of the VBV Buffer 602 would be immediately prior to each frame 106 being encoded in parallel, even if encoding of previous frames 106 is not yet complete. A non-limiting example of estimating fullness levels 608 immediately prior to each parallel frame 106 is shown in FIG. 7. The estimates of what the fullness level 608 would be immediately before each parallel frame 106 can be used in the selection of a value for the quantization parameter 208 to use when encoding each parallel frame 106.

In some embodiments, the encoder 100 can use the formulas shown in FIG. 8 to estimate the VBV Buffer's fullness level 608 immediately before each frame 106 being encoded in parallel. In FIG. 8, $B_{i\_}$ can indicate the estimated fullness level 608 of the VBV Buffer 602 immediately before frame i, where i is the frame index in the coding order. $R_{i\_estimate}$ can indicate the estimated number of bits that will be generated for frame i. In some embodiments, the estimated number of bits that will be generated for a particular frame 106 can be calculated using one or more Q-R (quantization rate) models. In some embodiments $R_{i\_estimate}$ can be used as an estimated number of bits that will be removed from the VBV Buffer 602 to decode frame i, which can be used determine the variable output rate 606. $R_{avg}$ can indicate the average number of bits generated per frame 106, such as the bitrate of the output bitstream 104 divided by its frame rate. In some embodiments, $R_{avg}$ can be used as the average number of bits that will enter the VBV Buffer 602 for each frame 106, which can be used to determine the constant input rate 604.

By way of a non-limiting example, when the encoder 100 begins to encode a set of four frames 106 in parallel, the estimated fullness level 608 just before the first frame ($B_{1\_}$) can be a known or estimated fullness level 608 of the VBV Buffer 602 just before the first frame is encoded. The estimated fullness level 608 just before the second frame ($B_{2\_}$) can be calculated by finding the difference between an estimate for the amount of bits that will be generated for the first frame ($R_{1\_estimate}$) and the average number of bits per frame ($R_{avg}$), and subtracting that difference from the estimated fullness level 608 just prior to the first frame ($B_{1\_}$). Similarly, the estimated fullness level 608 just before the third frame ($B_{3\_}$) can be calculated by finding the difference between an estimate for the amount of bits that will be generated for the second frame ($R_{2\_estimate}$) and the average number of bits per frame ($R_{avg}$), and subtracting that difference from the estimated fullness level 608 just prior to the second frame ($B_{2\_}$). Finally, the estimated fullness level 608 just before the fourth frame ($B_{4\_}$) can be calculated by finding the difference between an estimate for the amount of bits that will be generated for the third frame ($R_{3\_estimate}$) and the average number of bits per frame ($R_{avg}$), and subtracting that difference from the estimated fullness level 608 just prior to the third frame ($B_{3\_}$).

After estimating values for the fullness levels 608 immediately prior to each frame 106 being encoded in parallel, the encoder 100 can take the estimated fullness levels 608 into account when selecting values for each parallel frame's quantization parameter 208. The encoder 100 can use those values of the quantization parameter 208 to begin encoding each frame in parallel.

Although calculations using the formulas shown in FIG. 8 involve estimates of the number of bits that will be generated for each parallel frame 106 ($R_{i\_estimate}$), the encoder 100 can also track the actual number of bits that are generated for each parallel frame 106 once encoding begins. During encoding, the encoder 100 can enforce constraints on the number of bits actually being generated for each parallel frame 106, to reduce the chances that a high number of bits will underflow the VBV Buffer 602. By way of a non-limiting example, constraints on the number of bits actually being generated can be applied when the estimates used in the formulas of FIG. 8 for the number of bits that would be generated for frames 106 ($R_{i\_estimate}$) were incorrect, leading to an incorrect estimate of the fullness level 608 and thus lower than optimal quantization parameters 208, such that the output bitstream's actual bitrate is too high relative to the VBV Buffer's input rate 604. The encoder 100 can enforce constraints on the number of bits actually being generated for each parallel frame 106 such that the estimated fullness level 608 of the VBV Buffer 602 during actual encoding of each parallel frame 106 remains above the minimum fullness threshold 610.

FIG. 9 depicts formulas for estimating the fullness levels 608 for each parallel frame 106 once encoding has begun. Encoding can have already begun using quantization parameters 208 selected after using the formulas of FIG. 8 to estimate fullness levels 608 immediately prior to each parallel frame 106.

In FIG. 9, $B_{i\_}$ can indicate the estimated fullness level 608 of the VBV Buffer 602 just before encoding of the parallel frames began, such as the estimated fullness level 608 immediately prior to frame i, where i is the picture index in the coding order. $R_i$ can indicate the actual number of bits generated so far for a frame 106, up to the current CTU 302 being encoded. In embodiments in which the CTUs 302 are encoded in parallel, such as by using wavefront parallel processing (WPP) as described above with respect to FIG. 5, $R_i$ can be the sum of the number of bits generated so far for each parallel set of CTUs 302 within the frame 106. $R_{avg}$ can indicate average number of bits generated per frame 106, such as the bitrate of the output bitstream 104 divided by its frame rate, which can be linked to the constant input rate 604.

By way of a non-limiting example, when the encoder 100 is in the middle of encoding a set of four frames 106 in parallel, the estimated fullness level 608 relative to the first frame can be the difference between the estimated fullness level 608 just before encoding of the first frame began ($B_{1\_}$) and the number of bits actually generated so far for the first frame ($R_1$). The estimated fullness level 608 relative to the second frame can be calculated by adding the estimated fullness level 608 just before encoding of the first frame began ($B_{1\_}$) and the average number of bits generated per frame ($R_{avg}$) to account for the first frame, and then subtracting the number of bits generated so far for both the first frame and the second frame (the sum of $R_1$ and $R_2$). The estimated fullness level 608 relative to the third frame can be calculated by adding the estimated fullness level 608 just before encoding of the first frame began ($B_{1\_}$) and twice the average number of bits generated per frame ($R_{avg}$) to account for the first and second frames, and then subtracting the number of bits generated so far for the first frame, the second frame, and the third frame (the sum of $R_1$, $R_2$, and $R_3$). The estimated fullness level 608 relative to the fourth frame can be calculated by adding the estimated fullness level 608 just before encoding of the first frame began ($B_{1\_}$) and three times the average number of bits generated per frame ($R_{avg}$) to account for the first through third frames, and then subtracting the number of bits generated so far for the first frame, the second frame, the third frame, and the fourth frame (the sum of $R_1$, $R_2$, $R_3$, and $R_4$).

As the encoding process is ongoing, the encoder can track the estimated fullness levels 608 relative to each parallel frame 106 being encoded through the formulas shown in FIG. 9. If at any point during encoding an estimated fullness level 608 for one of the frames 106 drops to the minimum fullness threshold 610, the encoder 100 can enter skip mode and encode any remaining unencoded CTUs 302 in that frame 106 in skip mode, either by skipping encoding of residuals 202 and transform coefficients 204 or by setting transform coefficients 204 to zero. The encoder 100 can also begin encoding remaining unencoded CTUs 302 in preceding frames 106 in the coding order in skip mode. FIG. 10 depicts a non-limiting example of encoding remaining unencoded CTUs 302 in skip mode after some CTUs have already been encoded.

When CTUs 302 are encoded in skip mode, they can statistically can take up less than one bit each in the output bitstream, although for simplicity they can be considered to take one bit each. As such, when the encoder 100 switches to skip mode for remaining unencoded CTUs 302 of one or more frames 106, the total number of bits generated for those frames 106 can be constrained to the number of bits already generated for already encoded CTUs 302, plus at most one additional bit being added for each of the remaining CTUs 302 encoded in skip mode.

FIG. 11 depicts exemplary constraint conditions, that if triggered, can lead an encoder 100 to enter skip mode for remaining CTUs 302. The encoder 100 can monitor the amount of bits being generated for each frame 106 during encoding, and determine if any other constraint conditions apply. If any constraint condition applies, the encoder 100 can enter skip mode for remaining unencoded CTUs in some or all of the frames 106. As shown in the constraint conditions of FIG. 11, the encoder 100 can continuously compare the difference between its estimate of the fullness levels 608 for each parallel frame 106 and the minimum fullness threshold 610. If that difference is substantially equal to the number of remaining unencoded CTUs for any frame 106, the encoder 100 can begin encoding any remaining CTUs 302 in that frame 106 and preceding frames 106 in skip mode. By doing so, the remaining CTUs 302 can be encoded with at most one bit each, adding minimally to the number of bits already generated for the frames 106. This can avoid dropping the fullness level for the frame 106 below the minimum fullness threshold 610, and thereby avoid underflow of the VBV Buffer 602.

In some embodiments, the encoder 100 can enter skip mode for remaining CTUs 302 if the difference between its estimate of the fullness levels 608 for each parallel frame 106 and the minimum fullness threshold 610 is exactly a number of bits equal to the number of remaining CTUs 302. In other embodiments the encoder 100 can enter skip mode for remaining CTUs 302 if the difference between its estimate of the fullness levels 608 for each parallel frame 106 and the minimum fullness threshold 610 is within a preset threshold number above or below the number of bits equal to the number of remaining CTUs 302.

In some embodiments the encoder 100 can encode all remaining CTUs 302 in the frames 106 in skip mode when a constraint condition applies, regardless of the total number of remaining CTUs 302. In alternate embodiments, when the encoder 100 determines that a constraint condition applies, but the amount of remaining unencoded CTUs 302 is above a threshold percentage of the total number of CTUs 302 in the frame 106, the encoder 100 can re-encode the entire frame 106 in skip mode. By way of a non-limiting example, when the encoder 100 finds that the fullness level 608 for a frame 106 is nearing the minimum fullness threshold 610 and a constraint condition applies, but the number of remaining CTUs 302 in that frame is above a 40% threshold, the encoder 100 can determine that the entire frame 106 should be encoded in skip mode. The encoder 100 can return to the first CTU 302 in the frame 106 and re-encode all of the CTUs 302 in skip mode.

Figure 12:
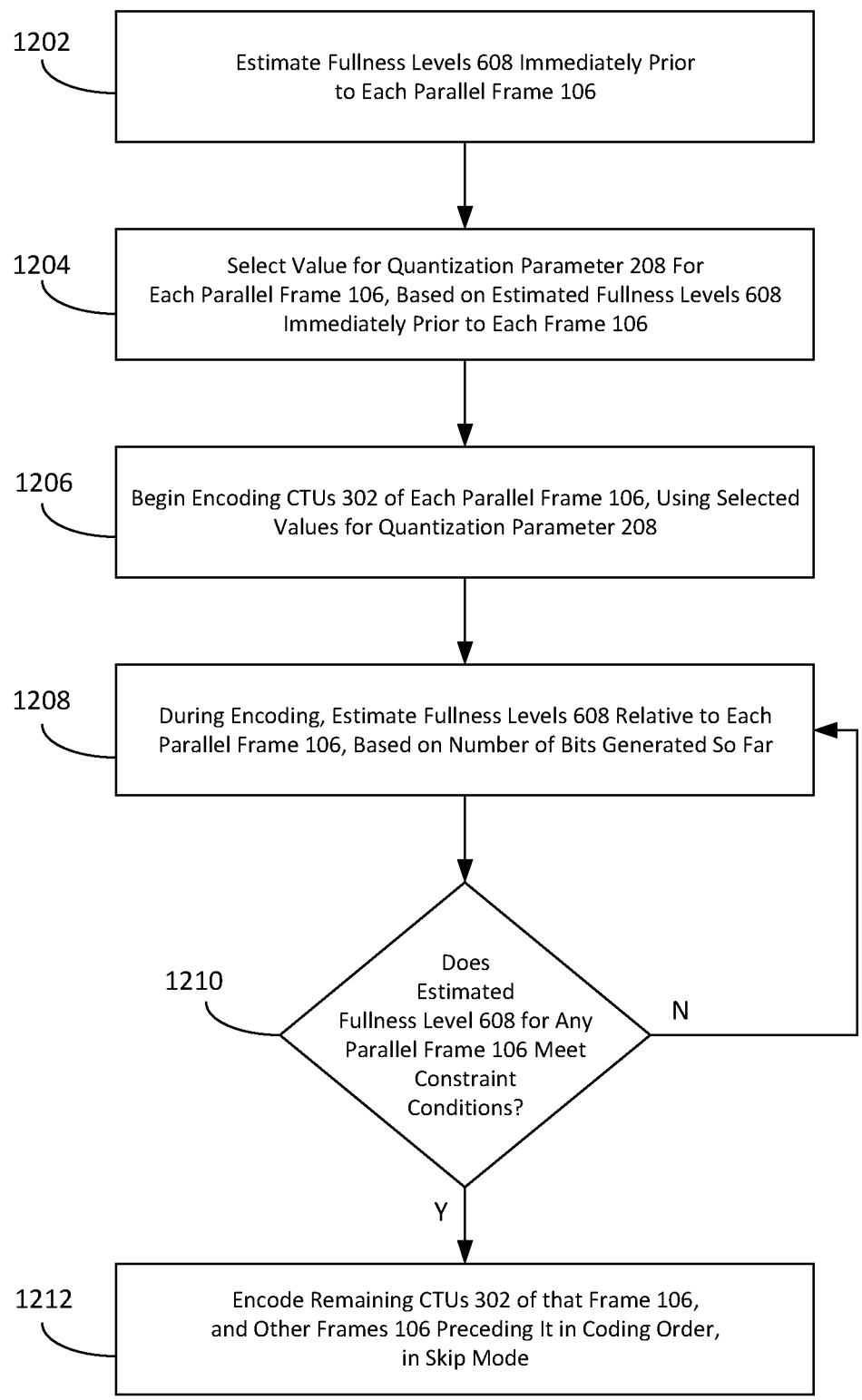
FIG. 12 depicts a flow chart of steps an encoder can use while encoding multiple frames in parallel to apply constraints on the number of bits being produced, to reduce the likelihood of underflowing the VBV Buffer.

FIG. 12 depicts a flow chart of the steps described above, which an encoder 100 can use while encoding multiple frames 106 in parallel to apply constraints on the number of bits being produced to reduce the likelihood of underflowing the VBV Buffer 602.

At step 1202, the encoder 100 can estimate the VBV Buffer's fullness level 608 as they would be immediately prior to encoding each parallel frame 106. In some embodiments, the encoder 100 can use the formulas shown in FIG. 8 to generate these estimates, as described above.

At step 1204, the encoder 100 can use the estimated fullness level 608 immediately prior to each parallel frame 106 to select values for the quantization parameters 208, as described above.

At step 1206, the encoder 100 can begin encoding CTUs 302 of each frame 106 in parallel, using the values for the quantization parameters 208 selected during step 1204, as described above.

At step 1208, while the parallel encoding is ongoing, the encoder 100 can continuously estimate the current fullness levels 608 relative to each of the parallel frames 106. In some embodiments, the encoder 100 can use the formulas shown in FIG. 9 to generate these estimates, as described above.

At step 1210, the encoder 100 can determine whether any of a set of constraint conditions apply, based on the most recent estimates of the current fullness levels 608 and the number of remaining unencoded CTUs 302. In some embodiments, the encoder 100 can enforce the constraint conditions shown in FIG. 11, as described above. If none of the constraint conditions apply, the encoder 100 can return to step 1208 and continue encoding the frames 106. However, if any of the constraint conditions do apply, the encoder 100 can move to step 1212.

At step 1212, the encoder 100 can use skip mode to encode any remaining CTUs 302 in the frame 106 that triggered a constraint condition, as well as any remaining CTUs 302 in parallel frames 106 preceding it in the coding order. In alternate embodiments, the encoder 100 can also re-encode all CTUs 302 that have already been encoded for a frame 106 if the number of remaining unencoded CTUs 302 is above a threshold percentage when a constraint condition is triggered.

Although the present invention has been described above with particularity, this was merely to teach one of ordinary skill in the art how to make and use the invention. Many additional modifications will fall within the scope of the invention, as that scope is defined by the following claims.

The invention claimed is:

1. A method of encoding multiple frames of a video in parallel, comprising
receiving a plurality of frames to encode in parallel at an encoder, said plurality of frames being ordered in a coding order;
generating an estimated starting fullness level of a video buffering verifier buffer prior to beginning encoding said plurality of frames;
beginning parallel encoding of said plurality of frames with said encoder, by encoding coding tree units within each of said plurality of frames;
monitoring the number of bits produced for each of said plurality of frames during parallel encoding of said plurality of frames;
tracking the number of unencoded coding tree units within each of said plurality of frames during parallel encoding of said plurality of frames;
continuously updating an actual fullness level of said video buffering verifier buffer relative to each frame during parallel encoding of said plurality of frames, by adding an average number of bits produced per frame for each preceding frame in the coding order to said estimated starting fullness level, and subtracting the number of bits produced for each coding tree unit that has been encoded so far in the frame and each preceding frame in the coding order; and
encoding in skip mode any remaining unencoded coding tree units in a particular frame and any preceding frames in the coding order when the difference between the particular frame's actual fullness level and a minimum fullness threshold for the video buffering verifier buffer equals the number of remaining unencoded coding tree units in that particular frame.

2. The method of claim 1, wherein coding tree units in each of said plurality of frames are encoded with said encoder sequentially within each of said plurality of frames.

3. The method of claim 1, wherein sets of coding tree units in each of said plurality of frames are encoded with said encoder in parallel within each of said plurality of frames, and the number of bits actually generated during encoding is the sum of the bits generated for each set of coding tree units encoded in parallel.

4. The method of claim 1, wherein encoding a particular coding tree unit in skip mode comprises encoding a motion vector pointing to a predicted unit and skipping encoding a residual difference between said particular coding tree unit and said predicted unit with transform coefficients.

5. The method of claim 1, wherein encoding a particular coding tree unit in skip mode comprises setting transform coefficients associated with said particular coding tree unit to zero.

6. The method of claim 1, further comprising re-encoding all previously encoded coding tree units in a particular frame and each preceding frame in the coding order in skip mode when the difference between the particular frame's actual fullness level equals the number of remaining unencoded coding tree units in that particular frame.

7. The method of claim 6, wherein re-encoding all previously encoded coding tree units is performed when the number of remaining unencoded coding tree units in said particular frame is above a preset threshold percentage.

8. A method of encoding multiple frames of a video in parallel, comprising
receiving a plurality of frames to encode in parallel at an encoder;
modeling the fullness level of a video buffering verifier buffer over time, relative to a constant input rate and a variable output rate;
generating an estimated fullness level for each of said plurality of frames, based on what said fullness level would be immediately prior to encoding of each of said plurality of frames, wherein said estimated fullness level is estimated at least in part based on an estimate of the number of bits that will be used to encode each of said plurality of frames;
selecting a value for a quantization parameter for each of said plurality of frames, based on the estimated fullness level for each of said plurality of frames;
beginning encoding of a plurality of coding tree units within each of said plurality of frames using the selected values of the quantization parameters;
generating an estimated actual fullness level for each of said plurality of frames, based on the number of bits actually generated during encoding of said plurality of coding tree units;
determining whether any of a plurality of constraint conditions applies; and
encoding in skip mode any of said plurality of coding tree units that have not yet been encoded upon a determination that one of said plurality of constraint conditions applies.

9. The method of claim 8, wherein one of said plurality of constraint conditions applies when the difference between the estimated actual fullness level for one of said plurality of frames is equal to the number of remaining unencoded coding tree units for said one of said plurality of frames.

10. The method of claim 8, wherein coding tree units in each of said plurality of frames are encoded with said encoder sequentially within each of said plurality of frames.

11. The method of claim 8, wherein sets of coding tree units in each of said plurality of frames are encoded with said encoder in parallel within each of said plurality of frames, and the number of bits actually generated during encoding is the sum of the bits generated for each set of coding tree units encoded in parallel.

12. The method of claim 8, wherein encoding a particular coding tree unit in skip mode comprises encoding a motion vector pointing to a predicted unit and skipping encoding a residual difference between said particular coding tree unit and said predicted unit with transform coefficients.

13. The method of claim 8, wherein encoding a particular coding tree unit in skip mode comprises setting transform coefficients associated with said particular coding tree unit to zero.

14. The method of claim 8, further comprising re-encoding in skip mode all coding tree units that have been previously encoded upon a determination that one of said plurality of constraint conditions applies.

15. The method of claim 14, wherein re-encoding all previously encoded coding tree units is performed when the number of remaining unencoded coding tree units is above a preset threshold percentage.

* * * * *